US010358053B2

(12) United States Patent
Uno et al.

(10) Patent No.: US 10,358,053 B2
(45) Date of Patent: Jul. 23, 2019

(54) SEAT ADJUSTER, VEHICLE SEAT, AND A METHOD OF ADJUSTING SEATBACK

(71) Applicant: TOYOTA BOSHOKU KABUSHIKI KAISHA, Aichi (JP)

(72) Inventors: Haruki Uno, Aichi (JP); Takuya Fujimura, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 224 days.

(21) Appl. No.: 15/600,983

(22) Filed: May 22, 2017

(65) Prior Publication Data

US 2017/0341536 A1 Nov. 30, 2017

(30) Foreign Application Priority Data

May 27, 2016 (JP) .................. 2016-106356

(51) Int. Cl.
*B60N 2/02* (2006.01)
*B60N 2/20* (2006.01)
*B60N 2/22* (2006.01)

(52) U.S. Cl.
CPC .............. *B60N 2/20* (2013.01); *B60N 2/02* (2013.01); *B60N 2/206* (2013.01); *B60N 2/22* (2013.01)

(58) Field of Classification Search
CPC .......... B60N 2/0244; B60N 2/01; B60N 2/22; B60N 2002/0272; B60N 2/20; B60N 2/235; B60N 2/2356; B60N 2/0837; B60N 2/0818; B60N 2/0843; B60N 2/123
USPC ............ 297/378.12, 361.1, 362, 341, 367 P; 701/49; 248/429, 430, 422
See application file for complete search history.

(56) References Cited

U.S. PATENT DOCUMENTS

| 4,641,884 | A | * | 2/1987 | Miyashita | ............ | B60N 2/2252 297/284.1 |
| 5,597,206 | A | * | 1/1997 | Ainsworth | ........... | B60N 2/0705 297/317 |
| 6,402,249 | B1 | * | 6/2002 | Rohee | ...................... | B60N 2/20 297/367 R |
| 7,520,568 | B2 | | 4/2009 | Hoshihara et al. | | |
| 7,726,741 | B2 | * | 6/2010 | Klahold | ................. | B60N 2/123 297/341 |

(Continued)

FOREIGN PATENT DOCUMENTS

| JP | 2006-34729 | 2/2006 |
| JP | 2015-146874 | 8/2015 |

*Primary Examiner* — Chi Q Nguyen
(74) *Attorney, Agent, or Firm* — Greenblum & Bernstein, P.L.C.

(57) ABSTRACT

A seat adjuster in one aspect of the present disclosure comprises a rotating part, a rotational drive, an engagement target member, an engagement member, and a controller. The controller executes a lock transition process in a case where a seatback is pivotally moved to a specified front-tilt position, which is further to a forward direction than an upright position is, while the engagement member is in an unlocked state where the engagement member is not engaged with any one of engagement target portions of the engagement target member. The lock transition process is a process where the controller rotates the rotating part via the rotational drive such that one of the engagement target portions is placed at an engageable position, and engages the engagement member with the one of the engagement target portions.

12 Claims, 11 Drawing Sheets

(56) References Cited

U.S. PATENT DOCUMENTS

| | | | |
|---|---|---|---|
| 9,039,086 B2* | 5/2015 | Morimoto | B60N 2/682 |
| | | | 297/342 |
| 9,180,796 B2* | 11/2015 | Markel | B60N 2/01583 |
| 10,093,201 B2* | 10/2018 | Auer | B60N 2/2356 |
| 2004/0164599 A1* | 8/2004 | Klahold | B60N 2/0248 |
| | | | 297/341 |
| 2008/0001458 A1 | 1/2008 | Hoshihara et al. | |

* cited by examiner

SEAT ADJUSTER, VEHICLE SEAT, AND A METHOD OF ADJUSTING SEATBACK

CROSS-REFERENCE TO RELATED APPLICATIONS

This application claims the benefit of Japanese Patent Application No. 2016-106356 filed on May 27, 2016 with the Japan Patent Office, the disclosure of which is incorporated herein by reference.

BACKGROUND

The present disclosure relates to an adjustment of a seatback.

Electric reclining devices that are disclosed, for example, in Japanese Unexamined Patent Application Publication No. 2015-146874 (hereinafter referred to as '874 Publication) and Japanese Unexamined Patent Application Publication No. 2006-034729 (hereinafter referred to as '729 Publication) are configured to adjust reclining angles of a seatback by pivotally moving the seatback relative to a seat cushion by electric power.

The electric reclining device disclosed in '729 Publication is further configured so that a mechanical connection between the seatback and the electric reclining device can be disengaged to enable the seatback to be folded forward to a large extent by hand.

SUMMARY

In the technique disclosed in '729 Publication, the reclining angle of the seatback is normally adjusted by electric power; but the seatback can be folded forward to a large extent by hand as needed. This can improve easiness of getting in and out of a rear seat area and easiness of loading luggage on the rear seat area for a passenger.

However, in the technique disclosed in '729 Publication, in order to adjust the reclining angle of the seatback again by electric power by means of the electric reclining device when the mechanical connection between the seatback and the electric reclining device has been disengaged and the seatback has been folded forward, the seatback needs to be raised by hand.

The technique disclosed in '729 Publication is therefore not always convenient as it cannot satisfy, for example, a need for a swift folding forward of the seatback by hand as well as a contrasting need for an easy automatic returning of the seatback afterwards.

It is desirable that one aspect of the present disclosure can improve the convenience in adjusting the angle of the seatback.

One aspect of the present disclosure is a seat adjuster that is provided in a vehicle seat that comprises a seat cushion and a seatback. The seatback is axially supported so as to be pivotally movable relative to the seat cushion. The seat adjuster comprises a rotating part, a rotational drive, an engagement target member, an engagement member, and a controller.

The rotating part is fixed to a first one of the seat cushion or the seatback, and is configured to be rotatable relative to the first one. The rotational drive is configured to rotatably drive the rotating part. The engagement target member is provided on the rotating part and is configured to rotate integrally with the rotating part. Engagement target portions are provided on the engagement target member along the rotating direction of the engagement target member.

The engagement member is provided on a second one, different from the first one, of the seat cushion or the seatback so that the engagement member is movable towards a first direction approaching the engagement target member and towards a second direction leaving the engagement target member. The engagement member is configured to be engageable with one of the engagement target portions that is placed at an engageable position with the engagement member, when the engagement member is moved to the first direction.

The controller is configured to execute a lock transition process in a case where the seatback is pivotally moved to a specified front-tilt position, which is further to a forward direction than an upright position is, while the engagement member is in an unlocked state where the engagement member is not engaged with any one of the engagement target portions. The lock transition process is a process where the controller rotates the rotating part via the rotational drive such that one of the engagement target portions is placed at the engageable position, and engages the engagement member with the one of the engagement target portions.

In a locked state where the engagement member is engaged with any one of the engagement target portions, the seat adjuster configured as described above can automatically adjust the position of the seatback since the seatback is pivotally moved as the rotating part is rotated by the rotational drive.

Meanwhile, in the unlocked state, the seatback is freely and pivotally movable relative to the rotating part, and the rotating part is freely rotatable relative to the seatback.

The seatback can therefore be swiftly folded forward by causing the engagement member to leave the engagement target member and disengaging the engagement member from the engagement target portion when the seatback stands at a position where the passenger can be seated.

After the seatback is folded forward, execution of the lock transition process by the controller causes the engagement member to be engaged with any one of the engagement target portions with the seatback remains folded forward. The seatback can thus be automatically returned by the rotational drive when returning from the folded position to the position where the passenger can be seated.

As mentioned above, the engagement target portions are provided on the engagement target member along the rotating direction of the engagement target member. Thus, after the seatback is folded forward, the time required to engage the engagement member again with any one of the engagement target portions can be shortened by rotating the engagement target member such that one of the engagement target portions that is positioned the closest to the engagement member moves to the engageable position. This enables the seatback to be swiftly and automatically returned again to the position where the passenger can be seated after being folded forward.

The aforementioned seat adjuster can therefore improve the convenience in adjusting the angle of the seatback.

If the seatback is configured to be pivotally movable relative to the seat cushion within a range from a specified frontmost tilt position to a specified rearmost tilt position, then the aforementioned specified front-tilt position may be the frontmost tilt position.

If the seatback is pivotally moved forward in the unlocked state and reaches the frontmost tilt position in this case, then the controller executes the lock transition process and causes the engagement member to be engaged again with any one of the engagement target portions (the locked state). This enables the passenger to swiftly increase a space for getting in and out of the vehicle by swiftly folding the seatback to the frontmost tilt position without using the rotational drive when, for example, the passenger enters or exits the rear seat. The passenger can raise the seatback again not by hand but automatically and easily by the rotational drive.

If the vehicle seat is configured so that it can be further converted into a tumbled mode from a state where the seatback is folded to the frontmost tilt position, then the controller may be configured to execute the lock transition process following an initiation of conversion to the tumbled mode after the seatback is folded to the frontmost tilt position in the unlocked state.

In this case, the engagement member is engaged with any one of the engagement target portions during the conversion to the tumbled mode; thus, it is not necessary to allocate an independent time for the lock transition process. In a case where the rotating part is configured to swing in a direction perpendicular to the shaft center of the rotating part, if the controller executes the lock transition process during the conversion to the tumbled mode, then the rotating part is rotated and placed into the locked state while the entire seat is moving. Accordingly, the movement of the entire seat can camouflage swinging movement of the rotating part.

The controller may further execute a return process at a specified return timing after the engagement member is engaged with any one of the engagement target portions by the lock transition process. The return process is a process where the controller rotates the rotating part via the rotational drive so that the seatback is pivotally moved to the upright position or to a specified return position that is further to a rearward direction than the upright position is.

In this case, the user can automatically and easily return the seatback to the return position after swiftly and pivotally moving the seatback forward in the unlocked state.

The seat adjuster may further comprise a front-tilt position detector that is configured to detect that the seatback is placed at the front-tilt position. In this case, the controller may further be configured to execute the lock transition process when the front-tilt position detector detects that the seatback is placed at the front-tilt position in the unlocked state.

According to such a seat adjuster, the controller can execute the lock transition process at an appropriate timing.

The seat adjuster may further comprise an engagement detector that is configured to detect that the engagement member is engaged with any one of the engagement target portions. In this case, the controller may further be configured to stop the rotation of the rotating part via the rotational drive when the engagement detector detects that the engagement member is engaged with any one of the engagement target portions in the lock transition process.

According to such a seat adjuster, the rotation of the rotating part is stopped without delay when the engagement member is engaged with any one of the engagement target portions; thus, a wasteful generation of drive force of the rotational drive can be reduced, and the controller can efficiently execute the lock transition process.

The engagement target portions may be provided at equal angular intervals along the rotating direction of the engagement target member. In other words, the engagement target portions may be provided along the rotating direction of the engagement target member and spaced at intervals of an angle calculated by dividing 360 degrees by the number of the engagement target portions.

In this case, the controller can more swiftly engage the engagement member with one of the engagement target portions that is positioned the closest to the engagement member in the lock transition process.

The equal angular intervals may be any equal angular intervals; for example, each angle of the equal angular intervals may be greater than the angle of a pivotally movable range of the seatback.

This would reduce the possibility and probability of the engagement member being engaged with any one of the engagement target portions even if the engagement member is biased towards the engagement target member in a process of folding the seatback forward in the unlocked state. Accordingly, an accidental inhibition of folding forward of the seatback can be reduced in this process of folding the seatback.

The seat adjuster may further comprise an engagement drive that is configured to move the engagement member to the first direction and the second direction. In this case, the controller may further execute a lock release process when given release conditions, under which the engagement member should be placed into the unlocked state, are satisfied after the engagement member is engaged with any one of the engagement target portions by the lock transition process. The lock release process is a process where the controller moves the engagement member to the second direction via the engagement drive, and rotates the rotating part via the rotational drive such that every one of the engagement target portions is placed at a position different from the engageable position.

According to such a seat adjuster, it is possible by appropriately setting the release conditions to disengage the engagement member from any one of the engagement target portions as needed when the engagement member is engaged with any one of the engagement target portions by the lock transition process after the seatback is folded forward. This enables the user to quickly raise the seatback again by hand.

The controller may further execute an original-point setting process that sets an original point to the rotational position of the rotating part of a time when the engagement member is engaged with any one of the engagement target portions by the lock transition process. The controller may be further configured to control the rotation of the rotating part via the rotational drive with reference to the original point that is set in the original-point setting process.

In this case, if the engagement member is disengaged from any one of the engagement target portions once, and thus the seatback is pivotally moved independently from the movement of the rotational drive, the original point of the rotating part is initialized by the subsequently performed lock transition process and original-point setting process. This enables the controller to precisely control the rotation of the rotating part that is performed via the rotational drive.

Another aspect of the present disclosure is a vehicle seat that comprises the seat cushion, the seatback, the rotating part, the rotational drive, the engagement target member, the engagement member, and the controller as mentioned above.

Such a vehicle seat can exert the same effects as those of the aforementioned seat adjuster.

Yet another aspect of the present disclosure is a method of adjusting a seatback that is axially supported so as to be pivotally movable relative to a seat cushion, the method comprising:

fixing a rotating part to a first one of the seat cushion or the seatback, wherein the rotating part is rotatable relative to the first one;

providing an engagement target member on the rotating part so as to rotate integrally with the rotating part, wherein the engagement target member is provided with engagement target portions thereon along a rotating direction of the rotating part;

providing an engagement member on a second one, different from the first one, of the seat cushion or the seatback so that the engagement member is movable towards a first direction approaching the engagement target member, and towards a second direction leaving the engagement target member; and, rotating the rotating part via a drive source such that one of the engagement target portions is placed at an engageable position with the engagement member and engaging the engagement member with the one of the engagement target portions in a case where the seatback is pivotally moved to a specified front-tilt position, which is further to a forward direction than an upright position is, while the engagement member is in an unlocked state where the engagement member is not engaged with any one of the engagement target portions.

Such a method of adjusting the seatback can exert the same effects as those of the aforementioned seat adjuster.

BRIEF DESCRIPTION OF THE DRAWINGS

Example embodiments of the present disclosure will now be described by way of example with reference to the accompanying drawings, in which.

DETAILED DESCRIPTION OF THE PREFERRED EMBODIMENTS

Embodiment 1

(1) Overall Configuration of Vehicle

Figure 1:
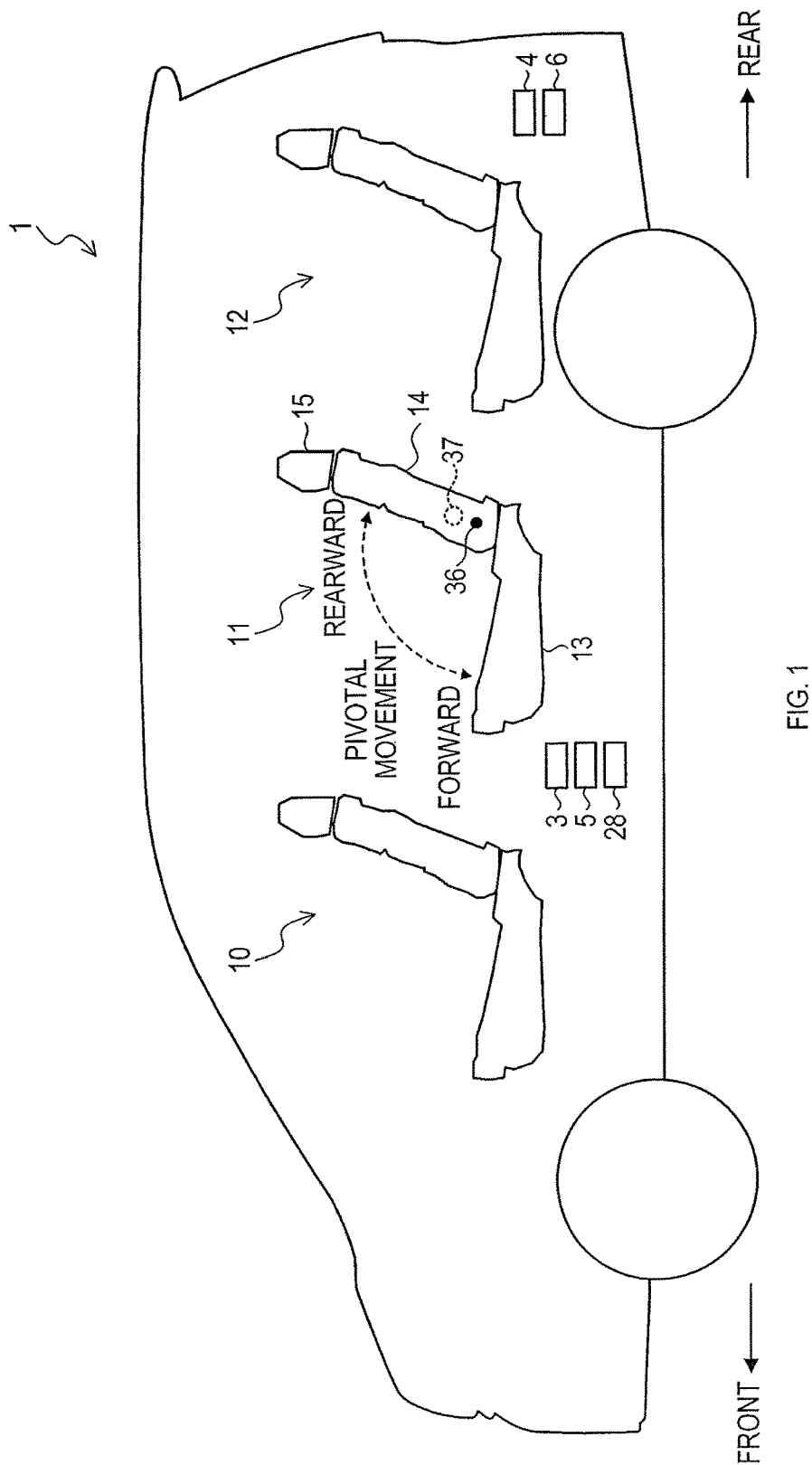
FIG. 1 is an explanatory diagram showing a simplified overall configuration of a vehicle according to a first embodiment.

As shown in FIG. 1, vehicle 1 is a three-row seater vehicle having three rows of seats arranged in front-rear direction. The vehicle 1 comprises a front seat 10 on the first row, a second seat 11 on the second row, and a third seat 12 on the third row arranged from the front to the rear of the vehicle 1.

Among these three rows of seats 10, 11, and 12, the second seat 11 will be focused hereinafter and explained in detail about its configurations and functions. The second seat 11 comprises a seat cushion 13 for supporting the buttocks of a user of the seat, and a seatback 14 for supporting the back of the user of the seat. A headrest 15 for supporting the head of the user of the seat is attached to the top of the seatback 14.

The second seat 11 comprises a reclining motor 37. The seatback 14 of the second seat 11 is configured to be driven by the reclining motor 37 and pivotally moveable about a shaft 36 to the direction indicated with a broken line arrow in FIG. 1.

In the present disclosure, the "forward" and the "rearward" of the direction of pivotal movement of the seatback 14 are defined as indicated with the broken line arrow in FIG. 1. To be specific, the "forward" pivotal movement of the seatback 14 means that a front surface of the seatback 14 moves towards an upper surface of the seat cushion 13 as the seatback 14 is folded forward to the front of the vehicle. The "rearward" pivotal movement of the seatback 14 means that the front surface of the seatback 14 moves away from the upper surface of the seat cushion 13 as the seatback 14 is reclined to the rear of the vehicle and moved towards the third seat 12.

The vehicle 1 comprises two passenger doors (a front door and a rear door) on the front and the rear of each side of a body of the vehicle. A passenger can sit on the front seat 10 by opening the front door or sit on the second seat 11 by opening the rear door.

The second seat 11 is, as mentioned later, configured so that a user, such as a driver and other passengers, can convert the second seat 11 into a table mode by folding the seatback 14 forward. As mentioned later, the second seat 11 is configured so that the user can further convert the entire second seat 11 from the table mode to a tumbled mode by pivotally moving the second seat 11 forward about the front-end side of the seat cushion 13. The user can thereby enter a space at the rear of the second seat 11 from the rear door and sit on the third seat 12 by opening the rear door and converting the second seat 11 into the table mode (and further into the tumbled mode). Moreover, the vehicle 1 comprises a luggage space door on its rear for loading luggage. The user can load or unload the luggage into and from the vehicle compartment from the rear side of the vehicle 1 by opening this luggage space door.

The vehicle 1 also comprises several switches that are operated by the user. To be specific, the vehicle 1 comprises a first folding switch 3, a second folding switch 4, a first return switch 5, a second return switch 6, and a lock-release switch 28.

The first folding switch 3, the first return switch 5, and the lock-release switch 28 are arranged, for example, on the second seat 11 or, in the vicinity of the second seat 11 such as on the rear door, so that the user can operate these switches from the rear door side (that is, by the side of the vehicle) by opening the rear door. The second folding switch 4 and the second return switch 6 are arranged, for example, in the vicinity of the luggage space door inside the vehicle compartment, so that the user can operate these switches by the luggage space door (that is, from the rear side of the vehicle 1) by opening the luggage space door.

(2) Configurations of Second-Row Seat

Figure 2:
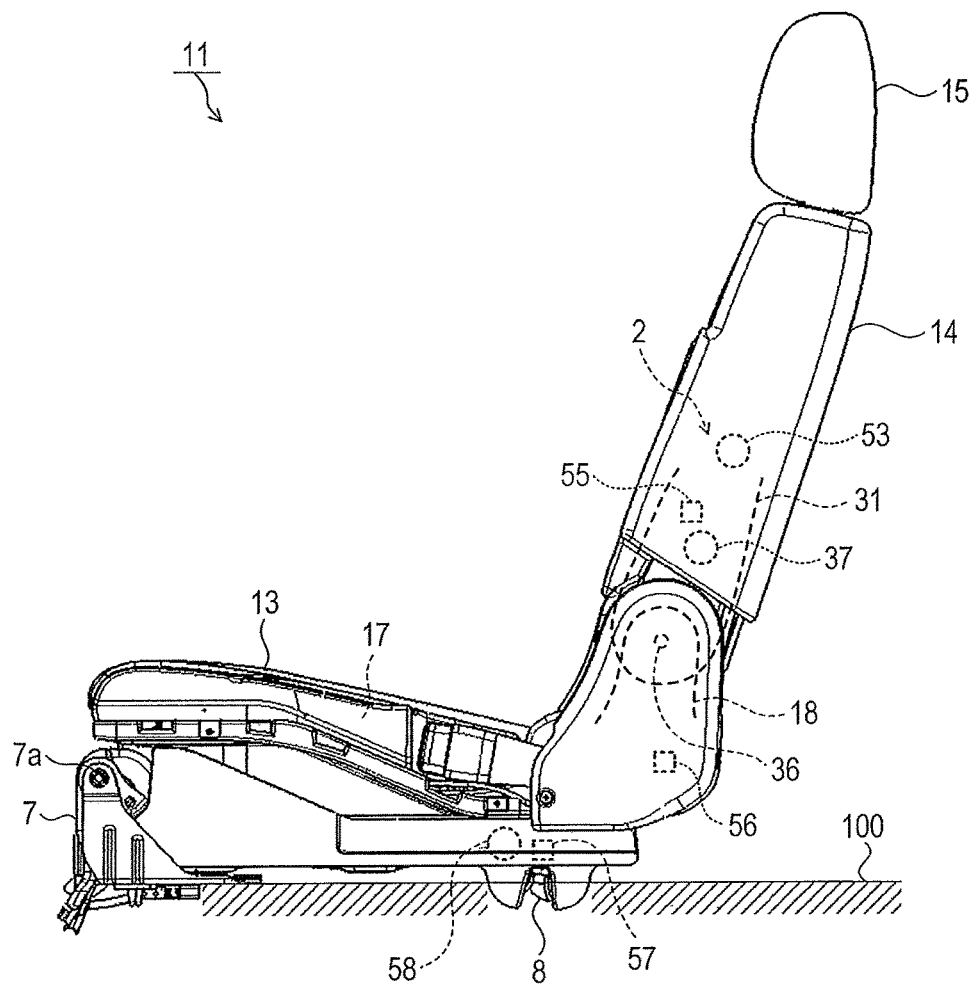
FIG. 2 is a side view of a seat according to the first embodiment.

More specific explanations of the configurations of the second seat 11 are now provided hereinafter with reference to FIG. 2. The second seat 11 is simply referred to as "seat 11" in the following explanations. As shown in FIG. 2, the seat 11 is provided on a floor 100 inside the vehicle compartment. A tumble mechanism 7 is installed on the floor 100; a hinge part 7a of this tumble mechanism 7 provides an axial support to a front-end part of the seat cushion 13. This configuration enables the seat 11 to move pivotally about the hinge part 7a of the tumble mechanism 7, and therefore enables the user to convert the seat 11 into the tumbled mode.

A floor lock 8 is provided on the rear portion of the bottom surface of the seat cushion 13. The floor lock 8 is a mechanism for fixing the seat 11 to the floor 100, and is a similar mechanism to a locking mechanism, which is heavily used for vehicle doors for example. To be specific, the floor lock 8 comprises a locking member that can be engaged with or disengaged from a striker that is provided on the floor 100. The seat 11 is fixed to the floor 100 by the locking member of the floor lock 8 being engaged with the striker.

This engagement of the locking member with the striker is mechanically performed by pressing the locking member against the striker. This engaged state of the locking member of the floor lock 8 with the striker is released when a floor-lock release motor 58 (hereinafter referred to as "release motor 58") is activated.

The user is unable to pivotally move the seat 11 by the tumble mechanism 7 in a state where the seat 11 is fixed to the floor 100 by the locking member of the floor lock 8 being engaged with the striker. When this fixation of the seat 11 to the floor 100 by means of the floor lock 8 is released, the user can pivotally move the seat 11 forward by the tumble mechanism 7 and convert the seat 11 into the tumbled mode. Note that, in the present embodiment, a biasing force is applied to the hinge part 7a of the tumble mechanism 7 by an elastic member (a coil spring, for example), which is not shown in the drawing, toward the direction to convert the seat 11 into the tumbled mode (tumble direction). Accordingly, the seat 11 is pivotally moved towards the tumble direction by the aforementioned biasing force, and converted into the tumbled mode when the release motor 58 is activated and the engaged state of the floor lock 8 with the striker on the floor 100 is released.

In the vicinity of the floor lock 8, a floor-lock limit switch 57 (hereinafter referred to as "limit switch 57") is provided. The limit switch 57 is turned on in a state where the floor lock 8 is locked to the floor 100 (that is, a state where the locking member of the floor lock 8 is engaged with the striker), and is turned off in a state where this locked state of the floor lock 8 to the floor 100 is released (that is, a state where the locking member of the floor lock 8 is disengaged from the striker).

The seatback 14 is axially supported so as to be pivotally movable about the shaft 36 relative to the seat cushion 13. To be more specific, the seat cushion 13 comprises a lower arm 17 that is included in a frame structure of the seat cushion 13, and a lower plate 18 is fixed to the back-end side of the lower arm 17. Meanwhile, the seatback 14 comprises a side frame 31 that is included in a frame structure of the seatback 14.

The seat 11 comprises a seat adjuster 2 for pivotally moving the side frame 31 relative to the lower plate 18 (thereby pivotally moving the seatback 14 relative to the seat cushion 13).

Figure 3:
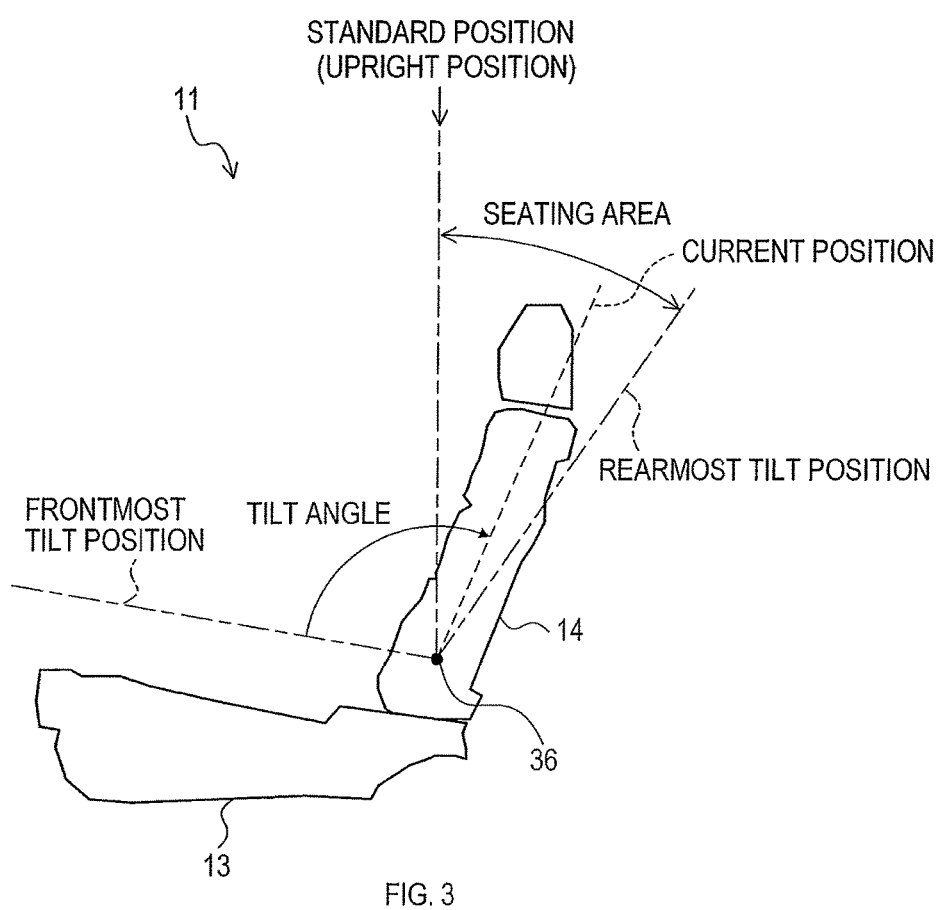
FIG. 3 is an explanatory diagram describing a range of pivotal movement of a seatback according to the first embodiment.

The pivotally movable range of the seatback 14 is now explained with reference to FIG. 3. As shown in FIG. 3, the seatback 14 is pivotally movable within a range from a frontmost tilt position to a rearmost tilt position. The frontmost tilt position is the position of the seatback 14 when the seatback 14 is folded forward to the maximum; and the rearmost tilt position is the position of the seatback 14 when the seatback 14 is reclined rearward to the maximum.

Here, an angle of the seatback 14 with reference to the frontmost tilt position is called a tilt angle. The tilt angle of the seatback 14 is 0 (zero) degrees in a state where the seatback 14 is placed at the frontmost tilt position. The tilt angle increases as the seatback 14 is pivotally moved rearward from the frontmost tilt position, and the tilt angle reaches its maximum at the rearmost tilt position.

The tilt angle of the seatback 14 can be changed by electric power. To be more specific, in a seating area that is from a specified standard position to the rearmost tilt position within the pivotally movable range, the tilt angle of the seatback 14 can be changed by electric power in a continuous or a step-by-step manner by the user's operation on a reclining switch, which is not shown in the drawing. The standard position in the present embodiment is an upright position. The upright position is a position where the seatback 14 stands approximately perpendicular to the floor 100.

The seat 11 is converted into a mode in which a back surface of the seatback 14 is approximately parallel to the floor 100 (hereinafter referred to as "the table mode") by having the seatback 14 folded forward to the frontmost tilt position. The user can use the back surface of the seatback 14 as a table for example, by converting the seat 11 into the table mode. The user can further convert the seat 11 into the tumbled mode by releasing the lock on the seat 11 to the floor 100 by means of the floor lock 8 when the seat 11 is in the table mode.

The reclining motor 37, which is a driving source to pivotally move the seatback 14 by electric power, is installed inside the seatback 14 as shown in FIG. 2. A seatback-lock release motor 53 (hereinafter referred to as "release motor 53"), and a seatback-lock limit switch 55 (hereinafter referred to as "limit switch 55") are also provided inside the seatback 14.

The seat 11 comprises a seatback-folding limit switch 56 (hereinafter referred to as "limit switch 56"). This limit switch 56 is turned on when the seatback 14 is placed at the frontmost tilt position, and is turned off when the seatback 14 is placed at any positions other than the frontmost tilt position.

(3) Configurations of Seat Adjusting Device

Detailed configurations of the seat adjuster 2 will be explained next, starting mainly with its mechanical configurations among other configurations with reference to FIG. 4 and FIG. 5. Electrical configurations of the seat adjuster 2 will be explained later with reference to FIG. 7.

The seat adjuster 2 mainly comprises a recliner 20, a coupling gear 21, a locking mechanism 40, the reclining motor 37 (see, FIG. 5), and the release motor 53. Note that some of the components shown in FIG. 4 (such as, a cam-driven arm 51, a wire 52, and the release motor 53) are omitted in FIG. 5 for a simplified explanation.

The recliner 20 is a mechanism to adjust the tilt angle of the seatback 14 by electric power (that is, a mechanism to transmit rotations of the reclining motor 37 to the seatback 14), and is fixed to the lower plate 18. As shown in FIG. 5, a recliner-fixing hole 18a is formed on the lower plate 18.

The recliner 20 is fixed to the lower plate 18 as one side-part of the recliner 20 is inserted through the recliner-fixing hole 18a.

Figure 5:
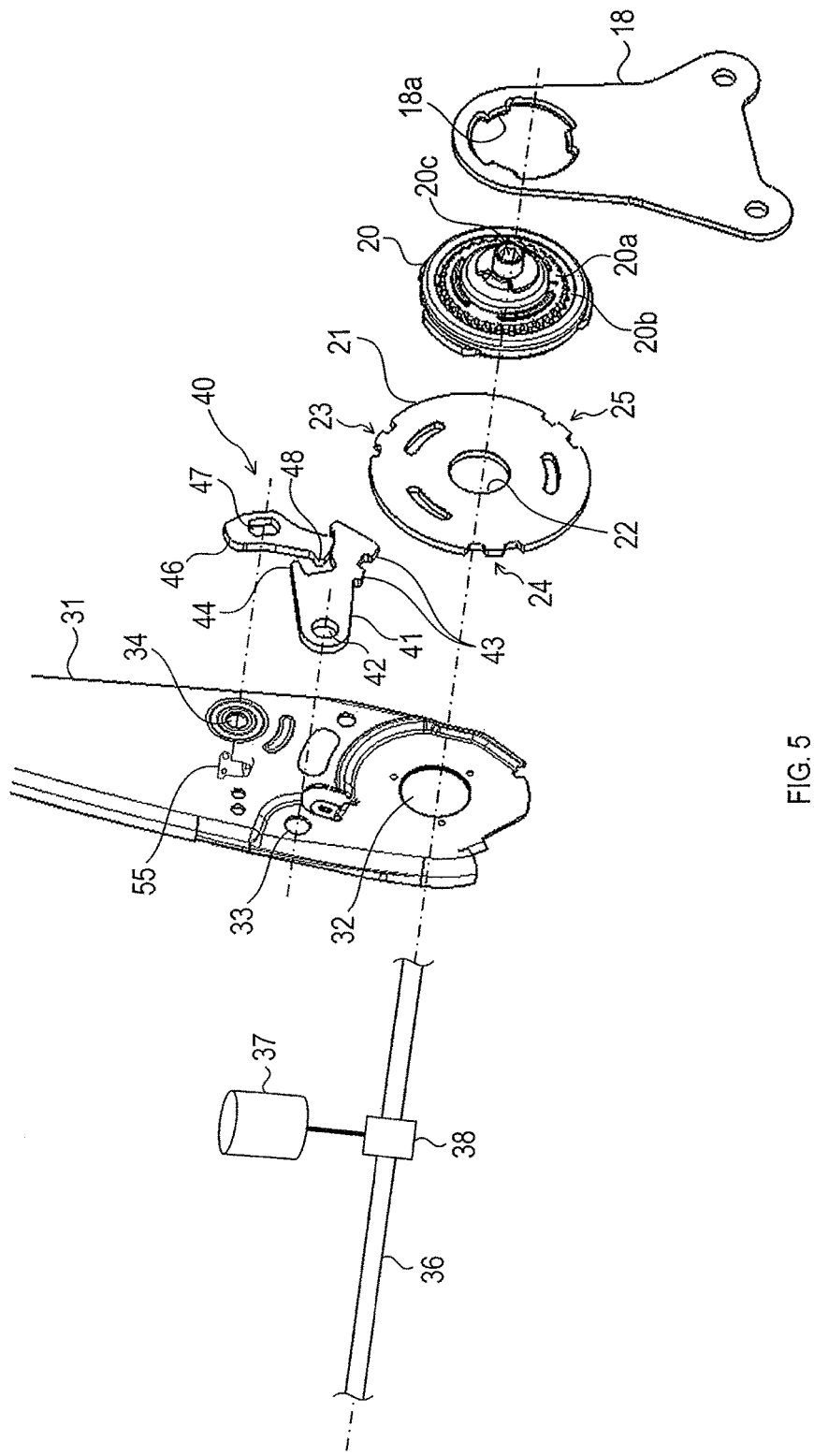
FIG. 5 is an exploded perspective view of the seat adjuster according to the first embodiment.

The recliner 20 comprises an external gear 20a, and an internal gear 20b as shown in FIG. 5. The external gear 20a and the internal gear 20b are arranged approximately coaxially so that internal teeth formed circularly on the internal gear 20b and external teeth formed around the outer circumferential surface of the external gear 20a face each other. The shaft 36, which is rotatably driven by the reclining motor 37, is inserted through a shaft through-hole 20c on the recliner 20. The internal gear 20b eccentrically rotates relative to the external gear 20a as the shaft 36 rotates. Detailed configurations of the recliner 20 that comprises the external gear 20a and the internal gear 20b are disclosed in the aforementioned '874 Publication and '729 Publication; therefore, those detailed configurations are omitted here.

The shaft 36 is driven by the reclining motor 37. The rotational drive force of the reclining motor 37 is transmitted to the shaft 36 via a rotation transmission mechanism 38; and rotation of the reclining motor 37 causes the shaft 36 to rotate.

A shaft through-hole 32 is formed on the side frame 31 of the seatback 14 as shown in FIG. 5; and a shaft through-hole 22 is formed on the coupling gear 21. The shaft 36 is inserted through the shaft through-hole 32 on the side frame 31 and the shaft through-hole 22 on the coupling gear 21, and then through the shaft through-hole 20c on the recliner 20.

The external gear 20a is fixed relative to the lower plate 18 in a state where the recliner 20 is fixed to the lower plate 18. Accordingly, the internal gear 20b rotates relative to the lower plate 18 when the shaft 36 rotates.

The coupling gear 21 is fixed to the internal gear 20b of the recliner 20, coaxially with the rotational axis of the internal gear 20b. Thus, as the rotation of the shaft 36 causes the internal gear 20b of the recliner 20 to rotate, the coupling gear 21 that is integrally fixed to the internal gear 20b also rotates integrally with the internal gear 20b.

Figure 6:
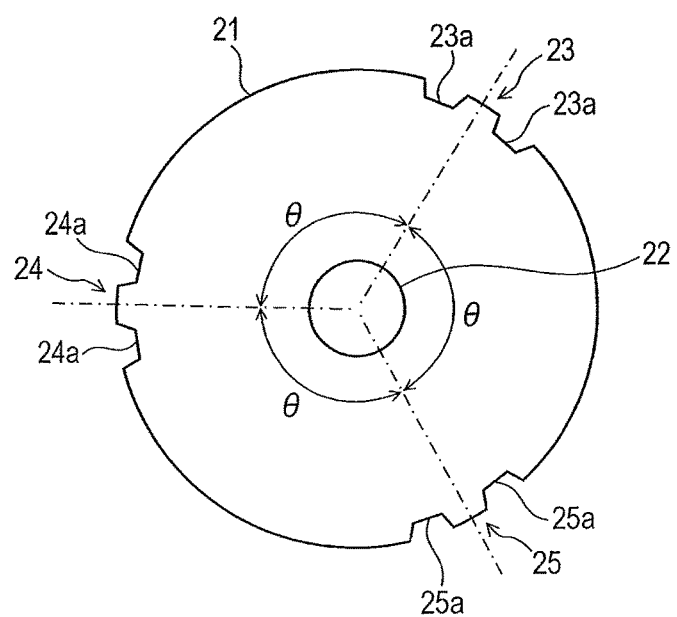
FIG. 6 is a diagram showing a detailed structure of a coupling gear that is included in the seat adjuster according to the first embodiment.

The coupling gear 21 has a disk-like shape as a whole. The first engagement target portion 23, the second engagement target portion 24, and the third engagement target portion 25 are respectively formed on three different locations on outer circumferential periphery of the coupling gear 21. In other words, three engagement target portions, 23 to 25, are formed on the coupling gear 21, spaced at equal angular intervals along the rotating direction of the coupling gear 21 as shown in FIG. 6. Since there are three engagement target portions, 23 to 25, formed along the rotating direction of the coupling gear 21, an angular interval θ between each pair of adjacent engagement target portions is 120 degrees in the present embodiment.

In the present embodiment, each of the engagement target portions 23 to 25 is formed on the coupling gear 21 to satisfy the following three conditions. The first condition is that the angular interval θ between circumferentially adjacent engagement target portions is greater than the angle of the pivotally movable range of the seatback 14 (the angle from the frontmost tilt position to the rearmost tilt position). The second condition is that these engagement target portions are arranged at equal angular intervals. And, the third condition is that, in a case where there are two or more angular intervals that satisfy the aforementioned first and second conditions, the smallest angular interval of all is set as the angular interval θ.

In the present embodiment, the pivotally movable range of the seatback 14 (the angle from the frontmost tilt position to the rearmost tilt position) is 110 degrees or in the vicinity of 110 degrees, for example, but is smaller than 120 degrees. Thus, 120 degrees and 180 degrees are the angular intervals that satisfy the aforementioned first and second conditions. Among these two angles, one that satisfies the third condition is 120 degrees. Therefore, the three engagement target portions 23 to 25 are formed at 120-degree intervals on the coupling gear 21 in the present embodiment.

The first engagement target portion 23 comprises two engaging concaves 23a. The second engagement target portion 24 and the third engagement target portion 25 have the exact same shape; the second engagement target portion 24 comprises two engaging concaves 24a, and the third engagement target portion 25 comprises two engaging concaves 25a. The engagement target portions 23 to 25 are each formed so that their respective two engaging concaves can be engaged with two engagement projections 43 on lock plate 41, which will be mentioned later.

Figure 4:
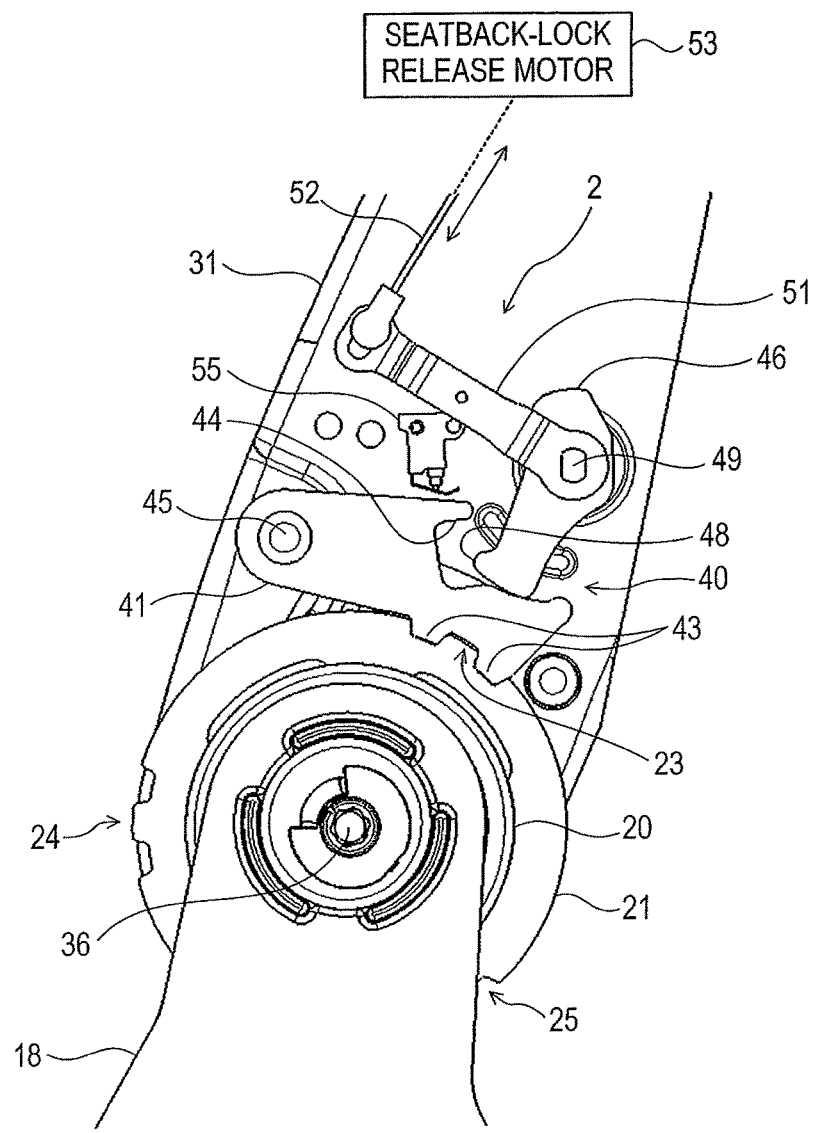
FIG. 4 is a diagram, taken from a side of the seat, showing a seat adjuster that is attached to the seat according to the first embodiment.

The locking mechanism 40 comprises a lock plate 41, and a cam 46 as shown in FIG. 4 and FIG. 5. The lock plate 41 is axially supported and fixed to the side frame 31 so as to be pivotally movable relative to the side frame 31. As shown in FIG. 5, a lock-shaft through-hole 42 is formed on the lock plate 41, and a first through-hole 33 is formed on the side frame 31. As shown in FIG. 4, a lock shaft 45 is inserted through the lock-shaft through-hole 42 and the first through-hole 33, enabling the lock plate 41 to pivotally move about the lock shaft 45.

As shown in FIG. 4, the lock plate 41 is arranged so that its plate surface is approximately flush with the plate surface of the coupling gear 21. The lock plate 41 is configured to be pivotally movable towards the directions approaching and leaving the outer circumferential surface of the coupling gear 21, on a plane that is flush with the plate surface of the coupling gear 21.

The lock plate 41 comprises two engagement projections 43 on its circumferential surface that faces the coupling gear 21. As the lock plate 41 pivotally moves towards the direction approaching the coupling gear 21 (moves clockwise in FIG. 4) when any one of the three engagement target portions 23 to 25 of the coupling gear 21 is placed at an engageable position where the engagement target portions can be engaged with the engagement projections 43 of the lock plate 41, the lock plate 41 engages with the engagement target portion that is placed at the engageable position. To be specific, each engagement projection 43 of the lock plate 41 is fitted to the respective engaging concaves of the engagement target portion to place the lock plate 41 in a state of being locked to the coupling gear 21. This state can also be expressed as a state where the lock plate 41 is mechanically coupled and locked to the recliner 20, and thus as a state where the seatback 14 is coupled and locked to the recliner 20.

FIG. 4 shows that the lock plate 41 is placed in the state of being locked to the coupling gear 21 by having the first engagement target portion 23 of the coupling gear 21 placed at the engageable position, and having the engagement projections 43 of the lock plate 41 engaged with the first engagement target portion 23.

Meanwhile, this engaged state is released as the lock plate 41 pivotally moves towards the direction leaving the coupling gear 21 (moves counterclockwise in FIG. 4) from the state of being locked to the coupling gear 21, and the engagement projections 43 of the lock plate 41 are disengaged from the engagement target portion of the coupling gear 21. The locked state of the lock plate 41 to the coupling gear 21 is thereby released.

The lock plate 41 is biased towards the direction approaching the coupling gear 21 by an elastic member (coil spring, for example), which is not shown in the drawing. The engagement projections 43 of the lock plate 41 therefore basically abut the coupling gear 21 at all times; and if any one of the engagement target portions is located at the engageable position, then the engagement projections 43 are engaged with the one of the engagement target portions and placed in the locked state.

The movement of separating the lock plate 41, which is locked to the coupling gear 21, from the coupling gear 21 and releasing the lock is performed by the cam 46.

The cam 46 is axially fixed to the side frame 31 so as to be pivotally movable to the side frame 31. As shown in FIG. 5, a camshaft through-hole 47 is formed on the cam 46; and the second through-hole 34 is formed on the side frame 31. As shown in FIG. 4, a camshaft 49 is inserted through these camshaft through-hole 47 and second through-hole 34; the cam 46 is thereby pivotally movable about the camshaft 49.

As also shown in FIG. 4, the camshaft 49 is inserted through one end of a cam-driven arm 51. The other end of the cam-driven arm 51 is coupled to a wire 52. The cam-driven arm 51 is axially supported so as to be pivotally movable relative to the side frame 31. The cross-section of the camshaft 49 has a shape of a rounded-corner rectangle, which fixes the relative positional relationship between the cam 46 and the cam-driven arm 51.

The cam 46 is biased towards the counterclockwise direction of its pivotal movement in FIG. 4 by an elastic member, which is not shown in the drawing. However, the cam 46 abuts the lock plate 41 as it pivotally moves counterclockwise as shown in FIG. 4; the counterclockwise movement of the cam 46 is thereby restricted. As regards the directions of pivotal movement of the cam 46 in FIG. 4, the counterclockwise direction can also be referred to as a lock-direction, and the clockwise direction can also be referred to as an unlock-direction.

The pivotal movement of the cam 46 in the unlock-direction is caused by the release motor 53. The wire 52 is pulled as the release motor 53 rotates, and the cam 46 thereby pivotally moves in the unlock-direction against the biasing force applied by the elastic member.

As the pivotal movement of the cam 46 in the unlock-direction is advanced by the release motor 53, a releasing projection 48 that is formed at the end portion of the cam 46 abuts a release-action piece 44 that is formed on the lock plate 41. As the pivotal movement of the cam 46 in the unlock-direction is further advanced, the lock plate 41 pivotally moves towards the direction leaving the coupling gear 21 by an acting force from the cam 46 towards the said direction and moves away from the coupling gear 21.

As the release motor 53 is stopped and the wire 52 is released from tension, the cam 46 pivotally moves in the lock-direction by the biasing force applied by the elastic member. The releasing projection 48 of the cam 46 accordingly leaves the release-action piece 44 of the lock plate 41, and the lock plate 41 abuts the coupling gear 21. If any one of the engagement target portions is placed at the engageable position at this time, then the lock plate 41 is locked to that engagement target portion.

The side frame 31 comprises the limit switch 55. The limit switch 55 is turned off when the lock plate 41 is engaged with the coupling gear 21 and placed in the locked state. The limit switch 55 is turned on when the locked state is released as the lock plate 41 leaves the coupling gear 21.

In the locked state where the lock plate 41 is engaged with the coupling gear 21, it is basically difficult to pivotally move the seatback 14 by hand since the seatback 14 is locked to the recliner 20. The seatback 14 is pivotally moved by electric power in this locked state by the operation of the reclining motor 37.

Meanwhile, in an unlocked state where the engagement of the lock plate 41 with the coupling gear 21 is released, the seatback 14 is free to move pivotally relative to the recliner 20 without being restrained by the recliner 20. The seatback 14 can thereby be freely and pivotally moved relative to the seat cushion 13 in the unlocked state. For example, the seatback 14 can be folded forward to the frontmost tilt position by hand.

The seatback 14 of the seat 11 in the present embodiment is biased towards the forward direction (the direction of the frontmost tilt position) of its pivotal movement by an elastic member, which is not shown in the drawing. Therefore, in the present embodiment, the seatback 14 pivotally moves to the frontmost tilt position or close to the frontmost tilt position by the biasing force applied by the elastic member or by its own weight without being moved by hand when locked state of the seatback 14 to the recliner 20 is released.

Figure 7:
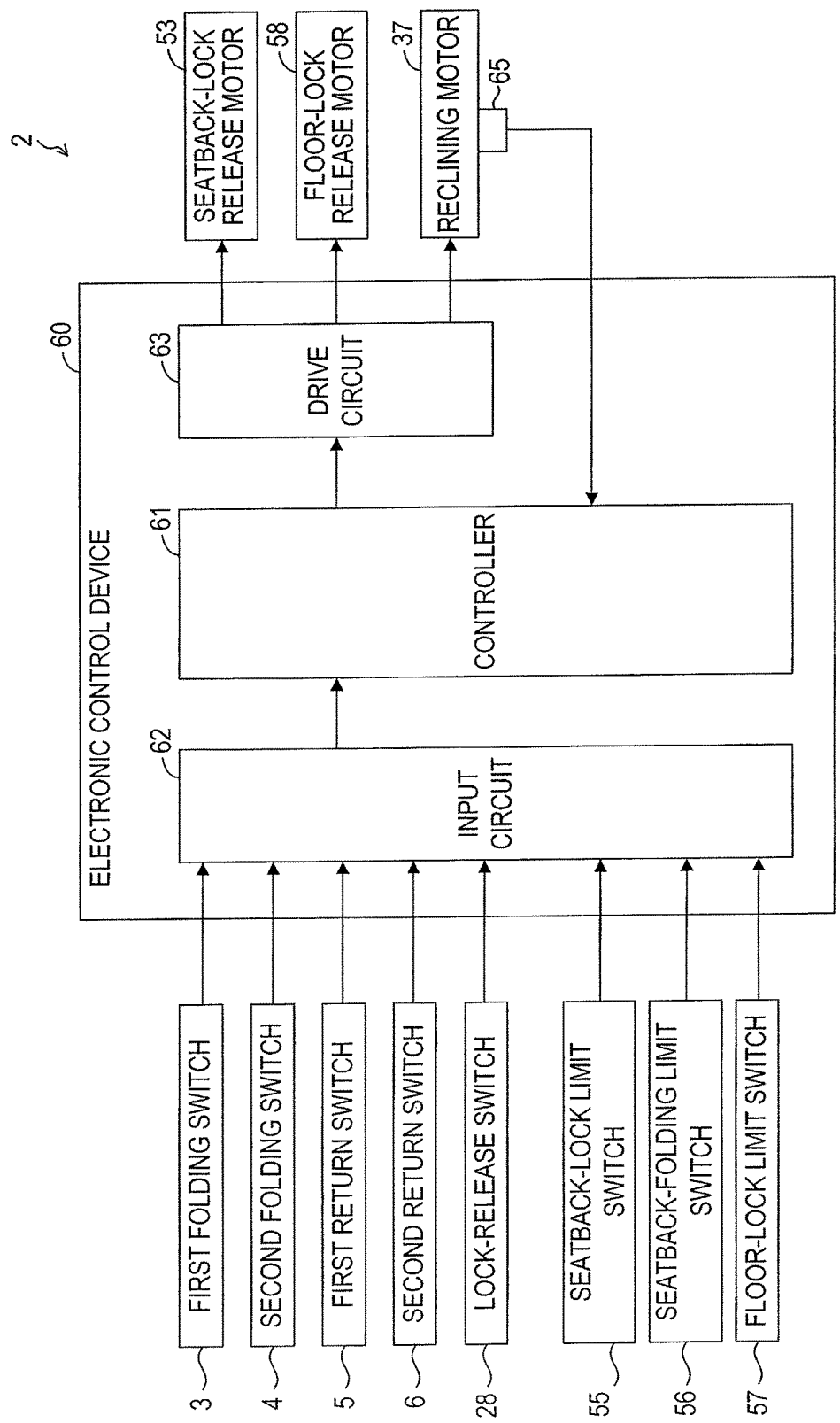
FIG. 7 is a block diagram showing an electrical configuration of the seat adjuster according to the first embodiment.

Electrical configurations of the seat adjuster 2 will be explained next with reference to FIG. 7. As shown in FIG. 7, the seat adjuster 2 in the present embodiment comprises an electronic control device 60. The seat adjuster 2 also comprises the aforementioned five switches that are operated by the user. More specifically, the seat adjuster 2 comprises the first folding switch 3, the second folding switch 4, the first return switch 5, the second return switch 6, and the lock-release switch 28. The seat adjuster 2 also comprises the aforementioned three limit switches 55, 56, and 57 that are turned on and off in accordance with the state of the seat 11. In addition, the seat adjuster 2 also comprises the reclining motor 37, the release motor 53, and the release motor 58.

The five switches 3, 4, 5, 6, and 28 are push-button switches, for example, that are turned on while being operated by the user and turned off when the operation by the user is released. The five switches 3, 4, 5, 6, and 28 are not necessarily push buttons; at least one of the five switches 3, 4, 5, 6, and 28 may be other type of switch. In the present embodiment, the three motors 37, 53, and 58 are brushed direct current motors for example. The three motors 37, 53, and 58 are however not necessarily brushed direct current motors; at least one of the three motors 37, 53, and 58 may be other type of motor (a brushless motor or a stepping motor, for example).

The electronic control device 60 comprises a controller 61, an input circuit 62, and a drive circuit 63. The input circuit 62 is coupled to the aforementioned switches and other switches, which are not shown in the drawing; and, signals from these switches are inputted into the input circuit 62. The input circuit 62 outputs the signals inputted from these switches to the controller 61 as they are, or after appropriate conversions (level conversion, AD conversion, and impedance conversion, for example).

The controller 61 comprises a microcomputer that includes a CPU and a memory, for example. Various functions of the controller 61 are performed by the CPU executing programs stored in the memory. Methods to achieve the various functions of the controller 61 are not limited to software; and a part of, or all of the functions of the controller 61 may be achieved using hardware by combining a logical circuit and an analog circuit, and the like.

The controller 61 determines operational state of each of the switches based on the signals that are inputted from each of the switches via the input circuit 62. The controller 61 outputs a drive signal to the drive circuit 63 when one of the switches are operated; the drive signal is for driving one or more motors corresponding to this operated switch among the aforementioned three motors 37, 53, and 58, and other motors that are not shown in the drawing.

The drive circuit 63 is configured so that it can drive-control the motors 37, 53, and 58 separately in accordance with the drive signal from the controller 61. The drive circuit 63 comprises a driving circuit (H-bridge circuit, for example) each for the motors 37, 53, and 58 for driving these motors separately.

Among the motors 37, 53, and 58, at least the reclining motor 37 comprises a rotation sensor 65. The rotation sensor 65 is coupled to the controller 61 in the electronic control device 60. A rotation signal that indicates a rotational position of the reclining motor 37 is outputted from the rotation sensor 65.

The controller 61 detects the rotational position of the reclining motor 37 based on the signal inputted from the rotation sensor 65, and then detects the position (the tilt angle) of the seatback 14 based on the detected rotational position. The controller 61 then controls the position of the reclining motor 37 (that is, the position of the seatback 14) based on the detected position.

The controller 61 controls the position of the seatback 14 with reference to a specified original position. In the present embodiment, the frontmost tilt position is set as the original position for the seatback 14. In other words, the controller 61 controls the position of the seatback 14 by controlling the tilt angle of the seatback 14 with reference to the frontmost tilt position.

(4) Seat Movement Examples

Movement examples of the seat adjuster 2 will be explained next with reference to FIG. 8, and FIG. 9. Pattern 1 and Pattern 2 will be illustrated here as the movement examples of the seat adjuster 2.

On the upper side of FIG. 8, and in FIG. 9, the coupling gear 21 and the lock plate 41 are schematically illustrated, and are illustrated likewise in FIG. 10, which will be mentioned later. More specifically, the lock plate 41 is illustrated as a square, and the three engagement target portions 23 to 25 of the coupling gear 21 are illustrated as circles on the upper side of FIG. 8, and in FIG. 9 and FIG. 10. For easier understanding of changes in the positional relationship between the three engagement target portions 23 to 25 and the lock plate 41, the circle representing the first engagement target portion 23 among the three circles that represent the three engagement target portions 23 to 25 is shown in black. A drawing of a form where the lock plate 41 is in contact with one of the three circles (Form 1A of FIG. 8, for example) shows that the lock plate 41 is engaged with the engagement target portion corresponding to that circle, which is in contact with the lock plate 41, and placed in the locked state. A drawing of a form where the lock plate 41 is not in contact with any one of the three circles (Form 1B of FIG. 8, for example) shows that the lock plate 41 is placed in the unlocked state where the lock plate 41 is not engaged with any one of the three engagement target portions 23 to 25.

(4-1) Explanation of Movement Examples of Pattern 1

Figure 8:
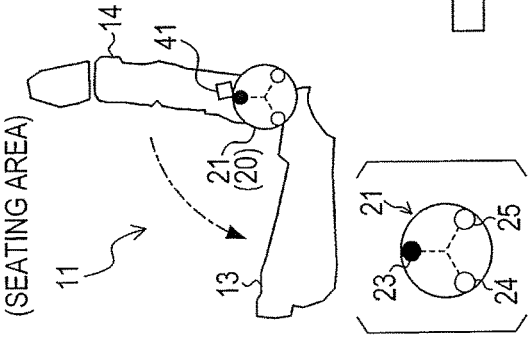
FIG. 8 is an explanatory diagram showing a movement example (Pattern 1) of the seat adjuster according to the first embodiment.
Figure 8:
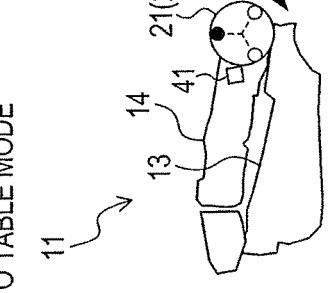
Figure 8:
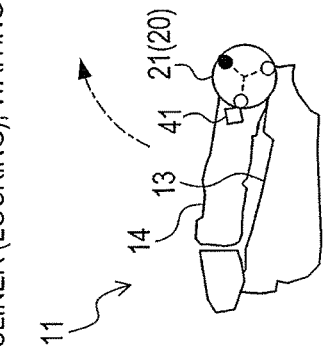
Figure 8:
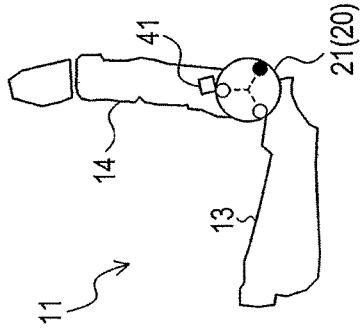
Figure 8:
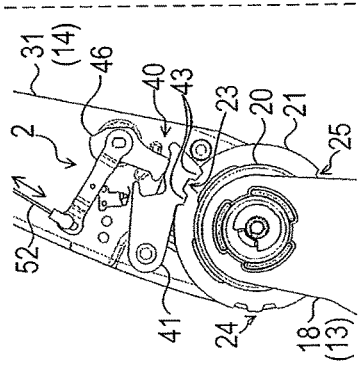
Figure 8:
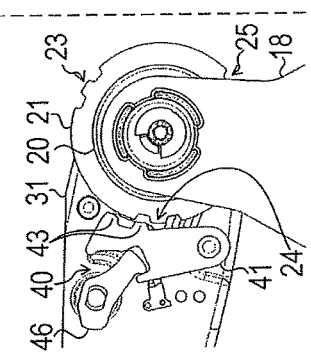
Figure 8:
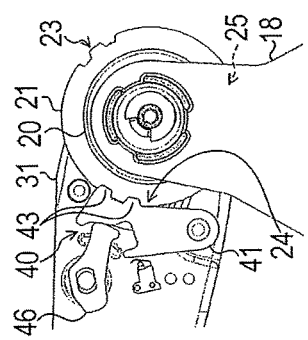
Figure 8:
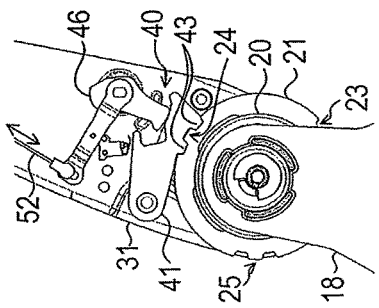

Among two movement patterns, Pattern 1 is explained first with reference to FIG. 8. The form shown in Form 1A of FIG. 8, in which the seatback 14 is positioned within the seating area and the lock plate 41 is engaged with the coupling gear 21 to lock the seatback 14 to the coupling gear 21 (that is, to the recliner 20), is called an initial mode. The initial mode in FIG. 8 illustrates a state where the lock plate 41 is engaged with the first engagement target portion 23 among the three engagement target portions 23 to 25 of the coupling gear 21.

In this initial mode, the user can discretionally adjust the position (the tilt angle) of the seatback 14 within the seating area by operating a reclining switch, which is not shown in the drawing.

As the first folding switch 3 that is provided on the rear door side is turned on in this initial mode, the controller 61 activates the release motor 53 to release the locked state of the seatback 14 to the coupling gear 21 and place the seatback 14 in the unlocked state. More specifically, the controller 61 activates the release motor 53, and the cam 46 is thereby pivotally moved to the unlock-direction to disengage the engagement projections 43 of the lock plate 41 from the first engagement target portion 23 of the coupling gear 21. The unlocked state causes the limit switch 55 to be turned on.

The seatback 14 pivotally moves forward by the aforementioned biasing force that acts on the seatback 14 and reaches the frontmost tilt position as shown in Form 1B of FIG. 8, when the locked state of the seatback 14 to the coupling gear 21 is released. The seat 11 is converted into the table mode when the seatback 14 reaches the frontmost tilt position. The user may appropriately add force to the seatback 14 by hand in the forward direction to support the seatback 14 to reach the frontmost tilt position.

As explained above, the seat 11 in the present embodiment is configured such that the seatback 14 can be decoupled from the recliner 20 by the user turning on the first folding switch 3, and swiftly folded forward to the frontmost tilt position without electric power.

A limit switch 56 is turned on when the seatback 14 reaches the frontmost tilt position; the controller 61 accordingly stops the release motor 53. The lock plate 41 is thereby biased towards the coupling gear 21.

The timing of stopping the release motor 53 is not limited to when the limit switch 56 is turned on; for example, it may be before the limit switch 56 is turned on (more specifically, during the pivotal movement of the seatback 14 towards the frontmost tilt position).

As mentioned above, the angular interval 0 of the engagement target portions 23 to 25 of the coupling gear 21 is greater than the pivotally movable range of the seatback 14 in the present embodiment. Thus, the engagement projections 43 of the lock plate 41 do not reach the position to face the second engagement target portion 24 of the coupling gear 21 when the seatback 14 reaches the frontmost tilt position. In other words, none of the three engagement target portions 23 to 25 of the coupling gear 21 are placed at the engageable position with the lock plate 41 in a state where the seatback 14 is released from the locked state and folded from the initial mode to the frontmost tilt position.

The unlocked state is therefore maintained immediately after the seatback 14 reaches the frontmost tilt position since the lock plate 41 is not placed in the locked state albeit abutting the coupling gear 21 even if the release motor 53 is stopped and the lock plate 41 is biased towards the coupling gear 21.

The limit switch 56 is turned on when the seatback 14 reaches the frontmost tilt position. The controller 61 executes a lock transition process to lock the lock plate 41 again to the coupling gear 21 when the limit switch 56 is turned on.

The controller 61 activates the reclining motor 37 to execute a process to rotate the recliner 20 rearwards (more specifically, rotate the recliner 20 clockwise in FIG. 8, which is the rotating direction to pivotally move the seatback 14 rearwards) as the lock transition process when the limit switch 56 is turned on. The "rotation" of the recliner 20 here means that the internal gear 20*b* rotates relative to the external gear 20*a* (therefore relative to the seat cushion 13), and further means that the coupling gear 21, which is fixed to the internal gear 20*b*, rotates integrally with the internal gear 20*b*.

As shown in Form 1C of FIG. 8, the second engagement target portion 24 among the three engagement target portions 23 to 25 of the coupling gear 21 thereby reaches the engageable position, engages with the engagement projections 43 of the lock plate 41, and is placed in the locked state.

The limit switch 55 is turned on when the locked state of the seatback 14 to the recliner 20 is released. The limit switch 55 is turned off when the seatback 14 is locked to the recliner 20 as shown in Form 1C of FIG. 8.

The controller 61 stops the reclining motor 37 and goes into a waiting mode when the limit switch 55 is turned off. At the same time, the controller 61 also executes an original-point setting process, that is, initialization of the original point. More specifically, the controller 61 executes a process to set the original point to a current rotational position of the reclining motor 37 (in other words, a current tilt angle of the seatback 14) as the original-point setting process. After the execution of the original-point setting process, the controller 61 executes its controls based on the original point that is set by the original-point setting process.

The seatback 14 can also be locked to the recliner 20 by rotating the recliner 20 forward after the seatback 14 is folded forward to the frontmost tilt position. As the recliner 20 is rotated forward (that is, the coupling gear 21 is rotated forward), the first engagement target portion 23, which has once been engaged with the lock plate 41 at the initial mode, reaches the engageable position and engages again with the lock plate 41, and is placed in the locked state.

As it is clear from the positional relationship between the first engagement target portion 23 and the second engagement target portion 24 relative to the lock plate 41 shown in Form 1B of FIG. 8, the second engagement target portion 24 is placed closer to the lock plate 41 than the first engagement target portion 23 is in Form 1B of FIG. 8. When comparing the amount of forward rotation necessary to cause the first engagement target portion 23 to reach the engageable position with the amount of rearward rotation necessary to cause the second engagement target portion 24 to reach the engageable position, the amount of rearward rotation necessary to cause the second engagement target portion 24 to reach the engageable position is required clearly less. Thus, the lock plate 41 is engaged with the second engagement target portion 24 of the coupling gear 21 by rotating the recliner 20 rearward in the present embodiment.

In the waiting mode shown in Form 1C of FIG. 8, the controller 61 executes a return process to bring the seatback 14 back to a specified return position and stop the seatback 14 by electric power as the user turns on the first return switch 5.

More specifically, the controller 61 activates the reclining motor 37 to rotate the recliner 20 rearward as the return process. At this time, the lock plate 41 is engaged with the second engagement target portion 24 of the coupling gear 21, and the seatback 14 is locked to the recliner 20. The seatback 14 is pivotally moved rearward along with the rearward rotation of the recliner 20.

The controller 61 detects the tilt angle of the seatback 14 based on the original point. If it is detected based on the detected result that the seatback 14 reaches the specified return position within the seating area as shown in Form 1D of FIG. 8, then the controller 61 stops the reclining motor 37. In other words, the controller 61 stops the seatback 14 at the return position. The return position may be appropriately determined; for example, it may be the standard position or the position at the initial mode, which is immediately before the first folding switch 3 is turned on.

In the initial mode shown in FIG. 8, the same movement as that performed when the first folding switch 3 is turned on may also be performed when the second folding switch 4 that is provided on the luggage space side is turned on. Alternatively, the seatback 14 may be pivotally moved by electric power to the frontmost tilt position by the reclining motor 37 when the second folding switch 4 is turned on. Alternatively, the seatback 14 may be folded forward by being unlocked when the second folding switch 4 is turned on, and may be folded forward by electric power when the first folding switch 3 is turned on.

In the waiting mode shown in Form 1C of FIG. 8, the seatback 14 may also be returned to the seating area by electric power when the second return switch 6 that is provided on the luggage space side is turned on in the same manner as when the first return switch 5 is turned on.

(4-2) Explanation of Movement Examples of Pattern 2

Pattern 2 will be explained next with reference to FIG. 9. The movement examples of Form 2A to Form 2C of Pattern 2 shown in FIG. 9 are exactly the same as the movement examples of Form 1A to Form 1C of Pattern 1 shown in FIG. 8. Therefore, Pattern 2 will be explained with regard to its movement examples of and subsequent to Form 2C of FIG. 9.

Figure 9:
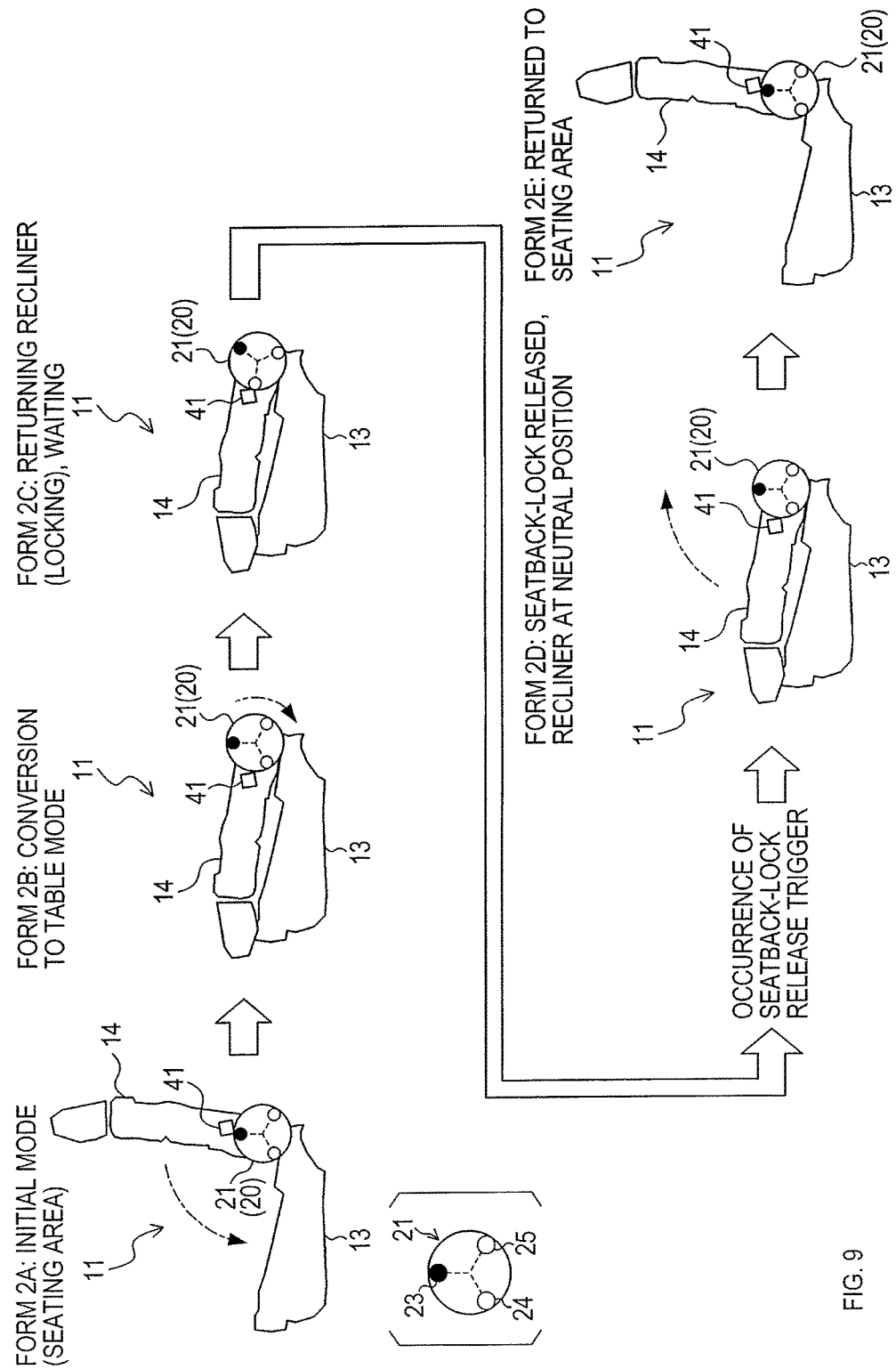
FIG. 9 is an explanatory diagram showing a movement example (Pattern 2) of the seat adjuster according to the first embodiment.

In the waiting mode shown in Form 2C of FIG. 9, the controller 61 activates the release motor 53 for a given time (1 to 3 seconds, for example) and causes the lock plate 41 to leave the coupling gear 21 to release the locked state of the seatback 14 when a specified seatback-lock release trigger, which should cause the lock of the seatback 14 to be released, occurs. The limit switch 55 is thereby turned on.

The controller 61 then activates the reclining motor 37 while activating the release motor 53 to rotate the recliner 20 forward, and stops the recliner 20 at a neutral position. The neutral position of the recliner 20 is a position where the arrangement of the three engagement target portions 23 to 25 of the coupling gear 21 is configured in the same manner as when the seatback 14 is in the locked state while being at the standard position.

The controller 61 stops the release motor 53 after activating the release motor 53 for the given time to rotate the recliner 20 to the neutral position.

The seatback-lock release trigger may be appropriately determined. In the present embodiment, at least the turning on of the lock-release switch 28 is set as a seatback-lock release trigger. In addition, opening of the rear door or the turning on of the second return switch 6 on the luggage space side may also be set as one of the seatback-lock release triggers.

Form 2D of FIG. 9 shows a state where the recliner 20 is rotated to the neutral position and stopped. The release motor 53 is also stopped at the same time, and the lock plate 41 is thereby biased towards the coupling gear 21. However, the lock plate 41 does not engage with any one of the engagement target portions of the coupling gear 21 and placed in the unlocked state since the coupling gear 21 is not placed at the engageable position.

The seatback 14 is thereby placed in a state where it is freely and pivotally movable relative to the recliner 20, and the user can return the seatback 14 to the seating area by quickly raise it by hand.

As mentioned above, the recliner 20 is at the neutral position in Form 2D of FIG. 9. Thus, as the user pivotally moves the seatback 14 rearward by hand, the lock plate 41 is engaged with the first engagement target portion 23 of the coupling gear 21 and placed in the locked state when the seatback 14 reaches at the standard position as shown in Form 2E of FIG. 9.

(5) Effect of First Embodiment

The following effects can be obtained according to the aforementioned first embodiment.

In the first embodiment, in the locked state where the lock plate 41 is engaged with any one of the three engagement target portions 23 to 25 of the coupling gear 21, the user can adjust the position of the seatback 14 by electric power by activating the reclining motor 37.

Meanwhile, the user can release the locked state of the seatback 14 to the recliner 20 by electric power by turning on the first folding switch 3 while the seatback 14 is positioned within the seating area. And, the user can subsequently fold the seatback 14 forward swiftly to the frontmost tilt position without electric power.

After the seatback 14 is released from the locked state to the recliner 20 and folded forward, the recliner 20 is rotated rearward; then the lock plate 41 is engaged with any one of the engagement target portions of the coupling gear 21 again and placed in the locked state. The user can return the seatback 14 by electric power to the seating area by turning on the first return switch 5 after the lock plate 41 is placed in the locked state.

Therefore, needs for swiftly folding the seatback 14 forward without electric power and returning the seatback 14 by electric power can be satisfied according to the seat 11 of the present embodiment, providing an increased convenience in adjusting the angle of the seatback 14. Particularly, the user can swiftly increases a space for the passenger to get in and out of the vehicle when, for example, the passenger needs to enter or exit the rear seat area since the user can swiftly fold the seatback 14 forward to the frontmost tilt position.

Note that it is not limited to placing the seatback 14 in the locked state when the seatback 14 is folded to the frontmost tilt position; for example, the seatback 14 may be folded only to a specified front-tilt position short of the frontmost tilt position in the unlocked state and placed in the locked state at the specified front-tilt position, and then returned to the seating area by electric power from the specified front-tilt position.

In the present embodiment, the limit switch 55 is turned on when the seatback 14 is folded to the frontmost tilt position in the unlocked state, which triggers the recliner 20 to rotate rearward. The limit switch 55 is turned off when the seatback 14 is in the locked state, which triggers the recliner 20 to stop its rotation.

Thus, the rearward rotation of the recliner 20, which is caused after the seatback 14 is folded forward to the frontmost tilt position, can be efficiently performed and stopped at appropriate timings.

The coupling gear 21 has a disk-like shape, and comprises engagement target portions respectively formed on different locations on outer circumferential periphery of the coupling gear 21. More specifically, in the present embodiment, the three engagement target portions 23 to 25 are formed along the rotating direction of the coupling gear 21, and spaced at equal angular intervals. This enables the coupling gear 21 to be swiftly engaged with the lock plate 41 by one engagement target portion among the engagement target portions 23 to 25, which is positioned the closest to the lock plate 41, after the seatback 14 is released from the locked state and folded forward.

An equal angular interval, at which the engagement target portions are formed on the coupling gear 21, is greater than the pivotally movable range of the seatback 14. This would reduce the possibility and probability of the lock plate 41 being engaged with the coupling gear 21 even if the lock plate 41 is biased towards the coupling gear 21 in a process of releasing the seatback 14 from the locked state by turning on the folding switch 3 and subsequently folding the seatback 14 forward. Accordingly, an accidental inhibition of folding of the seatback 14 can be reduced in a process of folding the seatback 14 forward.

In the present embodiment, the seatback 14 can be placed into the unlocked state again by the user turning on the lock-release switch 28 when the seatback 14 is placed in the locked state after being folded forward to the frontmost tilt position. Therefore, it is not always limited to using electric power for a movement of raising the seatback 14 again; the user can also swiftly perform the movement by hand as needed.

Here, the internal gear 20b corresponds to one example of the rotating part of the present disclosure. The reclining motor 37 that rotates the recliner 20 corresponds to one example of the rotational drive of the present disclosure. The coupling gear 21 corresponds to one example of the engagement target member of the present disclosure. The lock plate 41 corresponds to one example of the engagement member of the present disclosure; and the release motor 53 that is a driving source to pivotally rotate the lock plate 41 corresponds to one example of the engagement drive of the present disclosure. The timing that the first return switch 5 is turned on in the waiting mode shown in Form 1C of FIG. 8 corresponds to one example of the return timing of the present disclosure. The limit switch 56 corresponds to one example of the front-tilt position detector of the present disclosure; and the limit switch 55 corresponds to one example of the engagement detector of the present disclosure.

Embodiment 2

Pattern 3 of the movement examples of the seat adjuster 2 is now explained as the second embodiment; Pattern 3 is different from Pattern 1 and Pattern 2 of the first embodiment. In this second embodiment, the hardware configuration per se of the seat 11 is the same as the first embodiment, but a method of control by the controller 61 is partly different from that of the first embodiment. Movement examples that are achieved by the method of control, which is different from that of the first embodiment, are the movement examples of Pattern 3 shown in FIG. 10.

Figure 10:
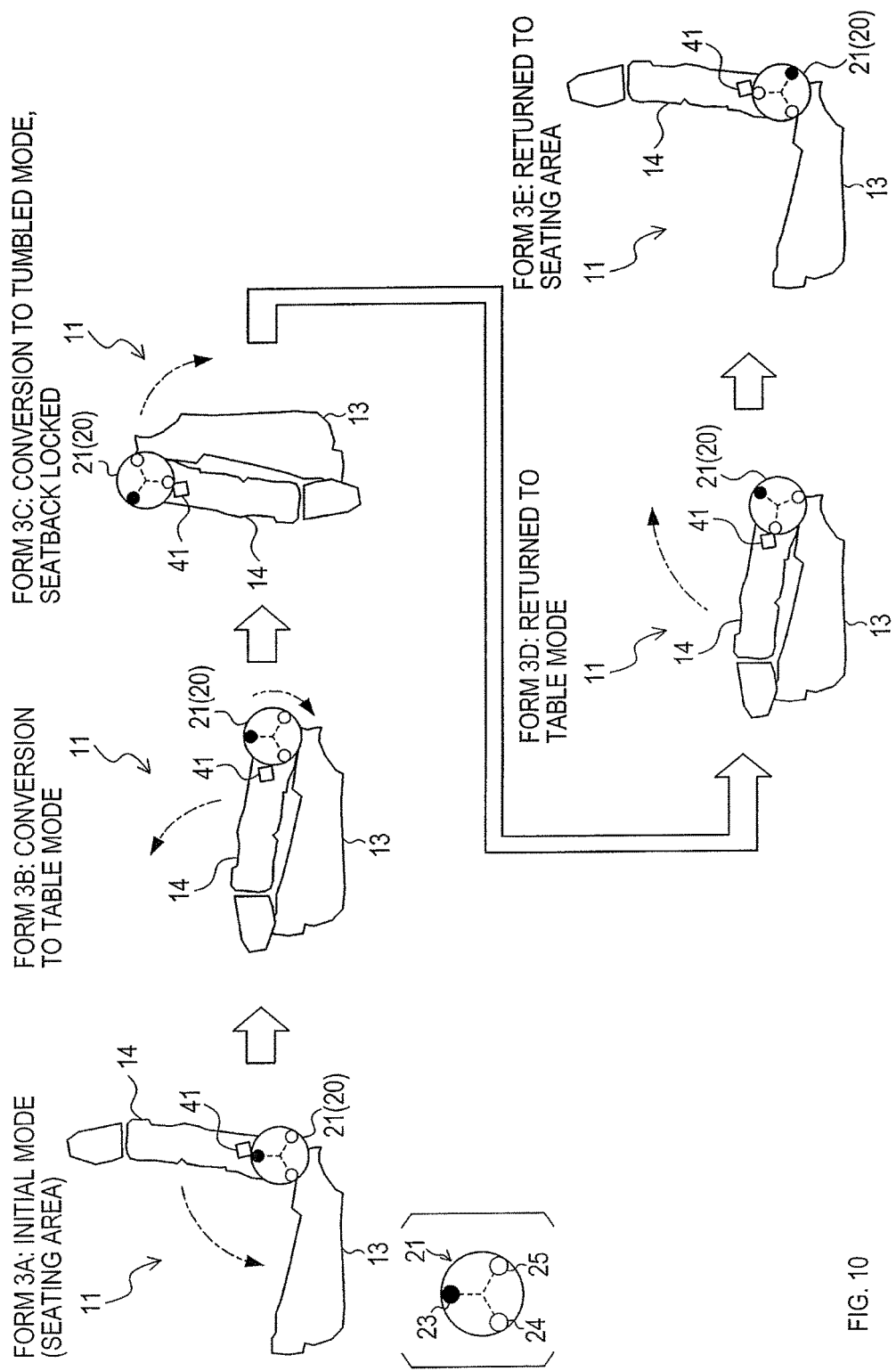
FIG. 10 is an explanatory diagram showing a movement example (Pattern 3) of a seat adjuster according to a second embodiment; and, FIG. 11 is a schematic drawing of a modification of a seat adjuster.

The movement examples of Form 3A to Form 3B of Pattern 3 shown in FIG. 10 are exactly the same as the movement examples of Form 1A to Form 1B of Pattern 1 shown in FIG. 8. Therefore, Pattern 3 will be explained with regard to its movement examples of Form 3B to Form 3E.

In the table mode shown in Form 3B of FIG. 10, the controller 61 activates the release motor 58 for a given time (a few seconds, for example) and release the locked state of the seat 11 to the floor 100 by the floor lock 8 when the first folding switch 3 is turned on again by the user. The seat 11 begins to pivotally rotate forward about the hinge part 7a of the tumble mechanism 7 by the aforementioned biasing force that the tumble mechanism 7 has when the floor lock 8 is released.

The controller 61 locks the seatback 14 to the recliner 20 in the process where the seat 11 is converted from the table mode to the tumbled mode (in other words, in the process where the seat 11 pivotally rotates). More specifically, if the first folding switch 3 is turned on when the seat 11 is placed in the table mode, then the controller 61 rotates the recliner 20 rearward to engage it with the lock plate 41. That is to say that, if the first folding switch 3 is turned on when the seat 11 is placed in the table mode, then the controller 61 subsequently executes the exact same controls as those explained in the aforementioned Form 1B to Form 1C of FIG. 8 on the recliner 20.

As shown in Form 3C of FIG. 10, the seat 11 is thereby in a state where the lock plate 41 is locked to the recliner 20 at the time when the conversion of the seat 11 to the tumbled mode is completed (a slight delay is allowed). The initialization of the original point, which is executed by the controller 61 when the lock plate 41 is placed in the locked state by the rearward rotation of the recliner 20, is the same as the first embodiment.

The user can convert the seat 11 from the tumbled mode back to the, table mode by hand. The floor lock 8 is placed in the locked state and the limit switch 57 is turned on as the user pivotally moves the seat 11 rearward by hand to convert the seat 11 back to the table mode as shown in Form 3D of FIG. 10.

The controller 61 starts returning the seatback 14 by electric power, triggered by the limit switch 57 being turned on. Exactly likewise the transition of modes in Pattern 1 of the first embodiment as shown in Form 1C to Form 1D, the controller 61 returns the seatback 14 to the return position within the seating area as shown in Form 3E of FIG. 10 by activating the reclining motor 37 to rotate the recliner 20 rearward.

Note that the seatback 14 may be returned to the return position by a trigger other than the turning on of the limit switch 57 when the seat 11 is converted from the tumbled mode back to the table mode. For example, turning on of the first return switch 5 or the second return switch 6 may be a trigger to cause the seatback 14 to be returned.

In addition, the seat 11 may be converted from the table mode to the tumbled mode by a trigger other than the turning on of the first folding switch 3. For example, turning on of the limit switch 56, which is caused when the seat 11 is converted from the initial mode to the table mode, may be a trigger to cause the floor lock 8 to be released to convert the seat 11 to the tumbled mode.

According to the aforementioned second embodiment, the following effects can be obtained in addition to the effects of the first embodiment as explained above.

In the second embodiment, the recliner 20 is rotated rearward and transition to the locked state is performed during the conversion to the tumbled mode. Thus, it is not necessary to allocate an independent time for the transition to the locked state.

As mentioned above in the first embodiment, the recliner 20 comprises the external gear 20a, and the internal gear 20b; the internal gear 20b eccentrically rotates as the reclining motor 37 rotates the shaft 36. This then causes the shaft 36 to eccentrically rotate as well. The seatback 14 is thus caused to swing in whole as the recliner 20 is rotated when the seat cushion 13 is fixed to the floor 100.

On the contrary, in this second embodiment, the seatback 14 is not placed in the locked state if the seatback 14 is folded forward in the unlocked state and left unmoved, but is placed in the locked state in a process where the seatback 14 is further converted to the tumbled mode. That is to say that the seatback 14 is placed in the locked state by the rotation of the recliner 20 while the entire seat 11 is moving. Accordingly, the movement of the entire seat 11 can camouflage swinging movements of the seatback 14.

Other Embodiments

The example embodiments of the present disclosure have been explained hereinbefore; nevertheless, the present disclosure may be embodied in various forms without being limited to the above-described embodiments.

(1) In the movement examples of Pattern 1 shown in FIG. 8, the timing of placing the lock plate 41 and the recliner 20 in the locked state by the controller 61 as shown in Form 1C after the seat 11 is converted into the table mode as shown in Form 1B may be appropriately determined. The lock plate 41 and the recliner 20 may be placed in the locked state by the controller 61, for example, after a given time has passed since the conversion of the seat 11 into the table mode, or, for example, when the first return switch 5 or the second return switch 6 is turned on.

(2) The locked state of the seatback 14 and the recliner 20 may be released by manual operations such as by operating an operating lever.

(3) The shape of the coupling gear 21 is not necessarily disk-like. It is not required that the coupling gear 21 should be disk-like as a whole; it is only required that the coupling gear 21 should have a shape that enables the engagement target portions to be arranged on a common circumference.

(4) It is not required that the engagement target portions should be formed at equal angular intervals on the coupling gear 21. The engagement target portions may be formed at two or more different angular intervals.

(5) It is not required that angular intervals of the engagement target portions on the coupling gear 21 should be made greater than the angle of the pivotally movable range of the seatback 14. The engagement target portions may be formed at angular intervals that are smaller than the angle of the pivotally movable range of the seatback 14.

As mentioned above, specific angular intervals and specific numbers of the engagement target portions to be formed on the coupling gear 21 may be appropriately determined.

(6) The locking mechanism 40 of the aforementioned embodiments is merely one example of a mechanism to lock or unlock the seatback 14 to or from the recliner 20. For example, the numbers and the shape of the engagement projection 43 to be formed on the lock plate 41 may be configured differently from the aforementioned embodiments. In such a case, the shape of each engagement target portion on the coupling gear 21 may be made to mesh with thus configured shape of the engagement projection 43 of the lock plate 41.

The engagement member may be locked or unlocked by a different actuator from the release motor 53.

It is also not required that the engagement member should be locked or unlocked by pivotally moving the lock plate 41. For example, an engagement member that has a specified shape may be locked or unlocked by linearly moving the engagement member relative to the coupling gear.

The configuration where the cam 46 is biased towards one direction of its pivotal movement by the elastic member is merely one example; a biasing force by the elastic member may not be required. In such a case, the cam 46 may be pivotally moved to both directions based on a driving source such as a motor and other actuators.

It is also merely one example that the lock plate 41 is biased towards the coupling gear 21 by the elastic member. For example, both the engagement of the lock plate 41 with the coupling gear 21 and releasing thereof may be performed based on a driving source such as a motor and other actuators without a biasing force by the elastic member.

The configuration where the locking mechanism 40 comprises the lock plate 41 and the cam 46 is intrinsically one example. Various other configurations that enable the seatback 14 to be engaged with and disengaged from the coupling gear 21 may be applied to the locking mechanism 40.

(7) The recliner 20 of the aforementioned embodiments is merely one example of the rotating mechanism that pivotally moves the seatback 14. The seatback 14 may be pivotally moved automatically by a rotating mechanism that is configured differently from the recliner 20 of the aforementioned embodiments.

Figure 11:
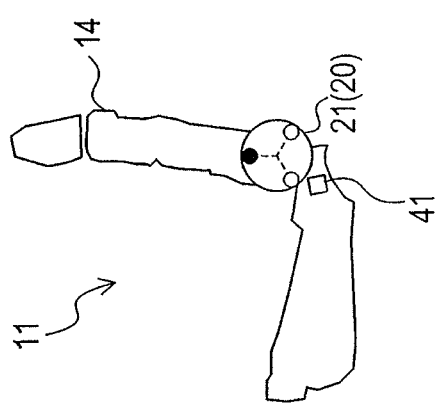

(8) In the aforementioned embodiments, the recliner 20 is fixed to the seat cushion 13, and the locking mechanism 40 is provided in the seatback 14. In contrast to this, as shown in FIG. 11, the recliner 20 may be fixed to the seatback 14, and the locking mechanism 40 (note that only the lock plate 41 is shown in FIG. 11) may be provided in the seat cushion 13.

(9) The present disclosure may be applied to any seats of any conveyances other than the vehicle 1 (for example, railroad vehicles, air carriers, and vessels).

(10) In addition, functions of one element in the aforementioned embodiments may be dispersed as two or more elements, or functions of two or more elements in the aforementioned embodiments may be integrated into one element. A part of the configuration of the aforementioned embodiments may be omitted; and at least a part of the configuration of the aforementioned embodiments may be added to or replaced with other configuration of the aforementioned embodiments.

What is claimed is:

1. A seat adjuster provided in a vehicle seat that comprises a seat cushion, and a seatback that is axially supported so as to be pivotally movable relative to the seat cushion, the seat adjuster comprising:
   a rotating part that is fixed to a first one of the seat cushion or the seatback, and is configured to be rotatable relative to the first one;
   a rotational drive that is configured to rotatably drive the rotating part;
   an engagement target member that is provided on the rotating part and is configured to rotate integrally with the rotating part, wherein the engagement target member is provided with engagement target portions thereon along a rotating direction of the engagement target member;
   an engagement member that is provided on a second one, different from the first one, of the seat cushion or the seatback so as to be movable towards a first direction approaching the engagement target member and towards a second direction leaving the engagement target member, wherein the engagement member is configured to be engageable with one of the engagement target portions that is placed at an engageable position with the engagement member when the engagement member is moved to the first direction; and
   a controller that is configured to execute a lock transition process in a case where the seatback is pivotally moved to a specified front-tilt position, which is further to a forward direction than an upright position is, while the engagement member is in an unlocked state where the engagement member is not engaged with any one of the engagement target portions, wherein the lock transition process is a process where the controller rotates the rotating part via the rotational drive such that one of the engagement target portions is placed at the engageable position and engages the engagement member with the one of the engagement target portions.

2. The seat adjuster according to claim 1,
   wherein the seatback is configured to be pivotally movable relative to the seat cushion within a range from a specified frontmost tilt position to a specified rearmost tilt position, and
   wherein the specified front-tilt position is the frontmost tilt position.

3. The seat adjuster according to claim 2,
   wherein the vehicle seat is configured so that the vehicle seat can be further converted into a tumbled mode from a state where the seatback is folded forward to the frontmost tilt position, and
   wherein the controller is configured to execute the lock transition process following an initiation of conversion to the tumbled mode after the seatback is folded forward to the frontmost tilt position in the unlocked state.

4. The seat adjuster according to claim 1,
   wherein the controller is further configured to execute a return process at a specified return timing after the engagement member is engaged with any one of the engagement target portions by the lock transition process, and
   wherein the return process is a process where the controller rotates the rotating part via the rotational drive so that the seatback is pivotally moved to the upright position or to a specified return position that is further to a rearward direction than the upright position is.

5. The seat adjuster according to claim 1, further comprising a front-tilt position detector that is configured to detect that the seatback is placed at the front-tilt position,
   wherein the controller is further configured to execute the lock transition process when the front-tilt position detector detects that the seatback is placed at the front-tilt position in the unlocked state.

6. The seat adjuster according to claim 1 further comprising an engagement detector that is configured to detect that the engagement member is engaged with any one of the engagement target portions,
   wherein the controller is further configured to stop a rotation of the rotating part via the rotational drive when the engagement detector detects that the engagement member is engaged with any one of the engagement target portions in the lock transition process.

7. The seat adjuster according to claim 1,
   wherein the engagement target portions are provided on the engagement target member at equal angular intervals along the rotating direction of the engagement target member.

8. The seat adjuster according to claim 7,
   wherein each angle of the equal angular intervals is greater than an angle of a pivotally movable range of the seatback.

9. The seat adjuster according to claim 1, further comprising an engagement drive that is configured to move the engagement member to the first direction and to the second direction, wherein the controller is further configured to execute a lock release process when given release conditions, under which the engagement member should be placed into the unlocked state, are satisfied after the engagement member is engaged with any one of the engagement target portions by the lock transition process, and wherein the lock release process is a process where the controller moves the engagement member to the second direction via the engagement drive, and rotates the rotating part via the rotational drive such that every one of the engagement target portions is placed at a position different from the engageable position.

10. The seat adjuster according to claim 1, wherein the controller is further configured to execute an original-point setting process that sets an original point to the rotational position of the rotating part of a time when the engagement member is engaged with any one of the engagement target portions by the lock transition process, and, wherein the controller is configured to control rotation of the rotating part via the rotational drive with reference to the original point that is set in the original-point setting process.

11. A vehicle seat comprising:

a seat cushion;

a seatback that is axially supported so as to be pivotally movable relative to the seat cushion;

a rotating part that is fixed to a first one of the seat cushion or the seatback, and is configured to be rotatable relative to the first one;

a rotational drive that is configured to rotatably drive the rotating part;

an engagement target member that is provided on the rotating part and is configured to rotate integrally with the rotating part, wherein the engagement target member is provided with engagement target portions thereon along a rotating direction of the engagement target member;

an engagement member that is provided on a second one, different from the first one, of the seat cushion or the seatback so as to be movable towards a first direction approaching the engagement target member and towards a second direction leaving the engagement target member, wherein the engagement member is configured to be engageable with one of the engagement target portions that is placed at an engageable position with the engagement member when the engagement member is moved to the first direction; and a controller that is configured to execute a lock transition process in a case where the seatback is pivotally moved to a specified front-tilt position, which is further to a forward direction than an upright position is, while the engagement member is in an unlocked state where the engagement member is not engaged with any one of the engagement target portions, wherein the lock transition process is a process where the controller rotates the rotating part via the rotational drive such that one of the engagement target portions is placed at the engageable position, and engages the engagement member with the one of the engagement target portions.

12. A method of adjusting a seatback that is axially supported so as to be pivotally movable relative to a seat cushion, the method comprising:

fixing a rotating part to a first one of the seat cushion or the seatback, wherein the rotating part is rotatable relative to the first one;

providing an engagement target member on the rotating part so as to rotate integrally with the rotating part, wherein the engagement target member is provided with engagement target portions thereon along a rotating direction of the rotating part;

providing an engagement member on a second one, different from the first one, of the seat cushion or the seatback so that the engagement member is movable towards a first direction approaching the engagement target member, and towards a second direction leaving the engagement target member; and, rotating the rotating part via a drive source such that one of the engagement target portions is placed at an engageable position and engaging the engagement member with the one of the engagement target portions in a case where the seatback is pivotally moved to a specified front-tilt position, which is further to a forward direction than an upright position is, while the engagement member is in an unlocked state where the engagement member is not engaged with any one of the engagement target portions.

\* \* \* \* \*